(12) United States Patent
Paredes

(10) Patent No.: US 8,767,539 B2
(45) Date of Patent: *Jul. 1, 2014

(54) SYSTEMS AND METHODS FOR RESOURCE BOOKING FOR ADMISSION CONTROL AND SCHEDULING

(75) Inventor: Ricardo Paredes, Ottawa (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 188 days.

This patent is subject to a terminal disclaimer.

(21) Appl. No.: 13/190,703

(22) Filed: Jul. 26, 2011

(65) Prior Publication Data

US 2013/0028079 A1  Jan. 31, 2013

(51) Int. Cl.
*H04W 28/02* (2009.01)
*H04L 12/56* (2006.01)

(52) U.S. Cl.
CPC .................... *H04L 47/823* (2013.01)
USPC ........................................ 370/230

(58) Field of Classification Search
USPC ......... 370/229, 230, 231, 232, 233, 234, 235, 370/241, 242
See application file for complete search history.

(56) References Cited

U.S. PATENT DOCUMENTS

| | | | |
|---|---|---|---|
| 5,408,465 A | 4/1995 | Gusella et al. | |
| 7,535,839 B2 | 5/2009 | Kadaba et al. | |
| 7,643,411 B2 | 1/2010 | Andreasen et al. | |
| 7,673,057 B1* | 3/2010 | Yip et al. | 709/229 |
| 2005/0050246 A1 | 3/2005 | Lakkakorpi et al. | |
| 2006/0140115 A1* | 6/2006 | Timus et al. | 370/230 |
| 2007/0002765 A1 | 1/2007 | Kadaba et al. | |
| 2007/0105563 A1 | 5/2007 | Ro et al. | |
| 2007/0121500 A1 | 5/2007 | McBride et al. | |
| 2008/0002576 A1* | 1/2008 | Bugenhagen et al. | 370/229 |
| 2010/0177687 A1 | 7/2010 | Sung et al. | |
| 2010/0255835 A1 | 10/2010 | Suzuki et al. | |
| 2011/0242972 A1* | 10/2011 | Sebire et al. | 370/229 |

FOREIGN PATENT DOCUMENTS

| | | |
|---|---|---|
| EP | 2 053 804 A2 | 4/2009 |
| GB | 2470066 A1 | 11/2010 |
| WO | 2007022789 A1 | 3/2007 |

OTHER PUBLICATIONS

International Search Report in corresponding International Application No. PCT/IB2012/001429 mailed Jan. 22, 2013.
Written Opinion of the International Searching Authority in corresponding International Application No. PCT/IB2012/001429 mailed Jan. 22, 2013.

(Continued)

*Primary Examiner* — Hassan Kizou
*Assistant Examiner* — Tejis Daya
(74) *Attorney, Agent, or Firm* — Patent Portfolio Builders PLLC

(57) ABSTRACT

Systems and methods provide for performing admission control in a communications network. The method includes: receiving a request for an entity or service for admission to the communications network; calculating resources, wherein the step of calculating resources includes: estimating a first future resource use for current entities and services in the communications network; and estimating a second future resource use for the entity or service received in the request; determining admission to the communications network of the received request based at least in part on the step of calculating resources; and using a partitionable booking window, if admission is allowed for the received request, for booking the first and second future resource uses based at least in part on the step of calculating resources.

28 Claims, 7 Drawing Sheets

(56) References Cited

OTHER PUBLICATIONS

CATT; "Difference between the TDM solution and LTE DRX"; 3rd Generation Partnership Project; 3GPP TSG RAN WG2 Meeting #72bis; R2-110206; XP050492931 Jan. 17-21, 2011; pp. 1-4; Dublin, Ireland.
ETRIi; "DRX operation for LTE-Advanced UE"; 3rd Generation Partnership Project; 3GPP TSG RAN WG2 #67bis; R2-095943; XP050390380; Oct. 12-16, 2009; pp. 1-3; Miyazaki, Japan.
LTE 3GPP; "3rd Generation Partnership Project; Technical Specification Group Radio Access Network; Evolved Universal Terrestrial Radio Access (E-UTRA); Medium Access Control (MAC) protocol specification (Release 11)"; 3 GPP TS 36.321 V11.2.0; Mar. 2013; pp. 1-56; Valbonne, France.
International Preliminary Report on Patentability mailed Oct. 2, 2013 in related International Application No. PCT/IB2012/001429.
International Search Report mailed on Feb. 28, 2014 in related Application No. PCT/IB2013/001283.
Written Opinion of the International Search Authority mailed on Feb. 28, 2014 in related Application No. PCT/IB2013/001283.
US Office Action mailed Feb. 11, 2014 in related U.S. Appl. No. 13/527,108.

\* cited by examiner

SYSTEMS AND METHODS FOR RESOURCE BOOKING FOR ADMISSION CONTROL AND SCHEDULING

TECHNICAL FIELD

The embodiments of the subject matter disclosed herein generally relate to communication systems and more particularly relate to admission control and scheduling in communication systems.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases, which in turn creates more usage, and leads to more services and system improvements. Additionally, these communication systems can evolve into new generations or partial generations of communication systems.

Various systems and methods have been used to deliver and/or request information between devices, nodes and networks in support of customer demand. In the context of networking applications and components, such as routers and gateways, networking systems are processing an increasing amount of data bandwidth year after year. With the rapidly growing popularity of the Internet on fixed and mobile networks, many networking systems often need to process more data, offer more bandwidth and to quickly introduce more features to the system while minimizing any negative impact on the currently existing capabilities of the systems themselves.

One such evolved network, for delivering improved quantity/quality of data, is based upon the Universal Mobile Telephone System (UMTS) which is an existing third generation (3G) radiocommunication system that is evolving into High Speed Packet Access (HSPA) technology. Yet another example is the introduction of another air interface technology within the UMTS framework, e.g., the so-called Long Term Evolution (LTE) technology.

One feature used in these communication networks which impacts quality of service (QoS) and resource control (both of which are important for both the user experience and for managing resources in a finite bandwidth) is admission control. Admission control can generally be described as the admission of a service request by a network node. For example, in an LTE communication system an eNodeB (eNB) performs admission control services for the various user equipments (UEs) which are communicating to a network through the eNB.

Considering admission control in a larger perspective of a communications system, admission control is a useful part of the QoS framework that provides end-to-end user and service differentiation. In wireless access networks, wireless links have capacity constraints due to issues such as user mobility, radio conditions at a cell edge and the like. Users and their associated services also have additional constraints such as tolerated delay, tolerated packet loss, etc. Admission control is integral with solutions for obtaining the desired QoS for users and their associated services.

Current admission control solutions typically focus on the current levels or static amount of available resources at the time of an entity or service request. As the quantity of users, available services, and the desire to use more bandwidth grows it will become more challenging to meet all of the expected future system requirements.

Accordingly, systems and methods for providing resources to users in systems are desirable.

SUMMARY

Exemplary embodiments describe admission control procedures for communication networks. By performing the exemplary admission control embodiments described herein, which consider future resource availability, improvements to admission control can be made.

According to an exemplary embodiment there is a method for performing admission control in a communications network, the method includes: receiving a request for an entity or service for admission to the communications network; calculating resources, wherein the step of calculating resources includes: estimating a first future resource use for current entities and services in the communications network; and estimating a second future resource use for the entity or service received in the request; determining admission to the communications network of the received request based at least in part on the step of calculating resources; and using a partitionable booking window, if admission is allowed for the received request, for booking the first and second future resource uses based at least in part on the step of calculating resources.

According to another exemplary embodiment there is a communication node for performing admission control. The communication node includes: a communications interface configured to receive a request for an entity or service for admission to the communications network; a processor configured to operate an admission control function and a scheduler; and the admission control function configured to calculate resources, estimate a first future resource use for current entities and services in the communications network, estimate a second future resource use for the entity or service received in the request, determine admission to the communications network of the received request based at least in part on the results of calculating resources, and configured to use a partitionable booking window, if admission is allowed for the received request, for booking the first and second future resource uses based at least in part on the results of calculating resources.

BRIEF DESCRIPTION OF THE DRAWINGS

The accompanying drawings illustrate exemplary embodiments, wherein.

DETAILED DESCRIPTION

Figure 1:
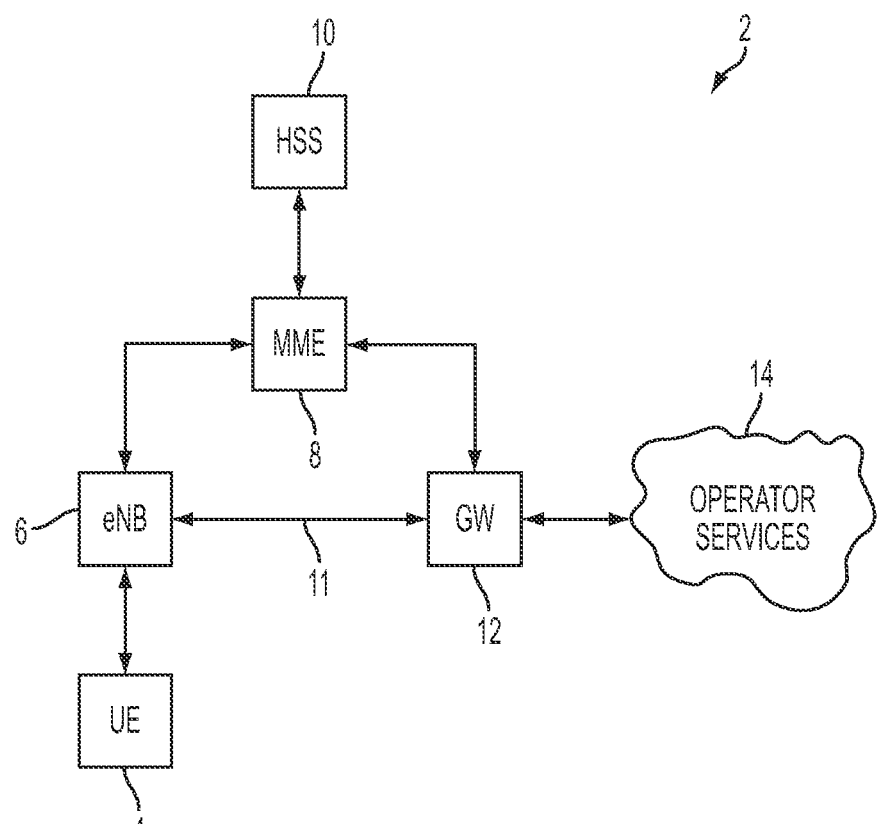
FIG. 1 depicts a long term evolution (LTE) communications network according to exemplary embodiments.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims. The following embodiments are discussed, for simplicity, with regard to the terminology and structure of Long Term Evolution (LTE) systems in the context of admission control and scheduling. However, the embodiments to be discussed herein are not limited to LTE systems but may be applied to other telecommunications systems, e.g., Wideband Code Division Multiple Access (WCDMA), Worldwide Interoperability for Microwave Access (WiMax), Ultra Mobile Broadband (UMB), Global System for Mobile Communications (GSM) and wireless local area network (WLAN), Universal Mobile Telecommunication System (UMTS), and their associated nodes as applicable which are used for similar admission control and scheduling functions.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to exemplary embodiments, in admission control systems, resources can be booked ahead of time for an entity or service being admitted into a communications network or some sub-portion thereof. These sub-portions or "systems" can be sub-sets of the various communication systems which can perform admission control by various communications nodes, e.g., eNodeBs (eNBs), gateways (GWs), routers and other nodes which perform some amount of admission control. The decision of whether or not to admit the entity or service to the communications network can be based on the availability of resources for the estimated required future resources and the expected life time of the service and its traffic characteristics (when appropriate). Current resource levels can also be considered as desired for admission control and scheduling. Booking windows can be used for the purpose of booking resources into the future for an entity, e.g., a subscriber or a UE, and/or service, e.g., a subscriber service, voice over internet protocol (VoIP) and web browsing. This can allow an entity or service to be granted admission even though there currently are not enough system resources available at present. Additionally, bit rates for a service can be limited by distributing a desired resource use amount over time. The resources may include resources for the control plane, for the data path, as well as other system resources such as memory, storage, bandwidth, etc.

Prior to describing exemplary embodiments associated with admission control in more detail, an exemplary LTE communication network 2, in which these exemplary embodiments can be implemented, will now be described with respect to FIG. 1. Initially, UE 4 is in communications with an eNodeB (eNB) 6 which contains various control functions for connection mobility control, scheduling, admission control and radio resource management. The eNB 6 communicates in the control plane with a mobility management entity (MME) 8. The MME 8 can manage, for example, the distribution of paging messages to the eNB(s) 6 and is also involved with the bearer activation/deactivation process. Additionally, the MME 8 is in communications with a home subscriber server (HSS) 10 which is a database containing subscriber information as well as containing information associated with specific services, e.g., bandwidth associated with a specific service.

The eNB 6 also communicates in the user plane with a gateway 12 (GW) (which can represent a serving gateway and/or a packet data network (PDN) gateway). The GW 12 can support the functions of inter 3GPP mobility as well as allowing access to Operator Services 14, e.g., Internet Protocol (IP) Multimedia Subsystem (IMS) services. Additionally, the GW 12 is in communications with the MME 8. According to exemplary embodiments, the GW 12 can also implement admission control policies as described herein over the backhaul communications link 11 between the eNB(s) 6 and the GW 12. While FIG. 1 shows parts of an exemplary LTE network 2, it is to be understood that other communication networks which have nodes that perform admission control can also implement some or all of the exemplary embodiments described herein. Also a plurality of UEs 4, eNBs 6 and GWs 12 can be used and/or supported by exemplary embodiments described herein.

According to exemplary embodiments, a booking window can be used for booking future resources associated with an entity or a service in support of admission control by a communication node. A "resource" as used herein can include any resource in the system, e.g., a subset of a communication network, that is impacted by a new service (or services) and/or entity (or entities) which may be admitted into the system. Individual resources may have a separate booking window or resources may be combined into one or more booking windows. Additionally, bearers associated with a resource can be automatically prioritized by the booking window.

According to exemplary embodiments, a booking window can have multiple properties. The booking window can be partitioned into transmission slots of duration t, where t can be a configurable value. A transmission slot can be associated with the resources required to process traffic and other functions for users and the users' services for the period of time that the transmission slot lasts. The booking window can represent all future transmissions, transmission slots and their associated resources. When this occurs, the booking window may be considered to be infinite. Alternatively, the booking window can be implemented with a configurable, fixed size buffer. When the booking window is implemented with a fixed size buffer, the buffer can be similar to a circular buffer which can perform in a manner similar to the infinite booking window, e.g., the buffer can act in a "wrap around" fashion over writing obsolete transmission slots or transmission slots which have been released.

According to exemplary embodiments, transmission slots booked for an entity or service can be released when the entity or service is terminated. For a finite sized buffer, transmission slots can only be booked as far into the future as the booking window size permits. These transmission slots can remain booked for the entity or service and may be repeated or reused as the booking window repeats itself over time. Additionally, entities and services can be booked in a way to meet and/or support their respective constraints. For example, a Voice over IP (VoIP) service with a specified delay tolerance of 20 ms can be booked with transmission slots separated by 20 ms (or less) to ensure that the delay constraint is met.

Figure 2:
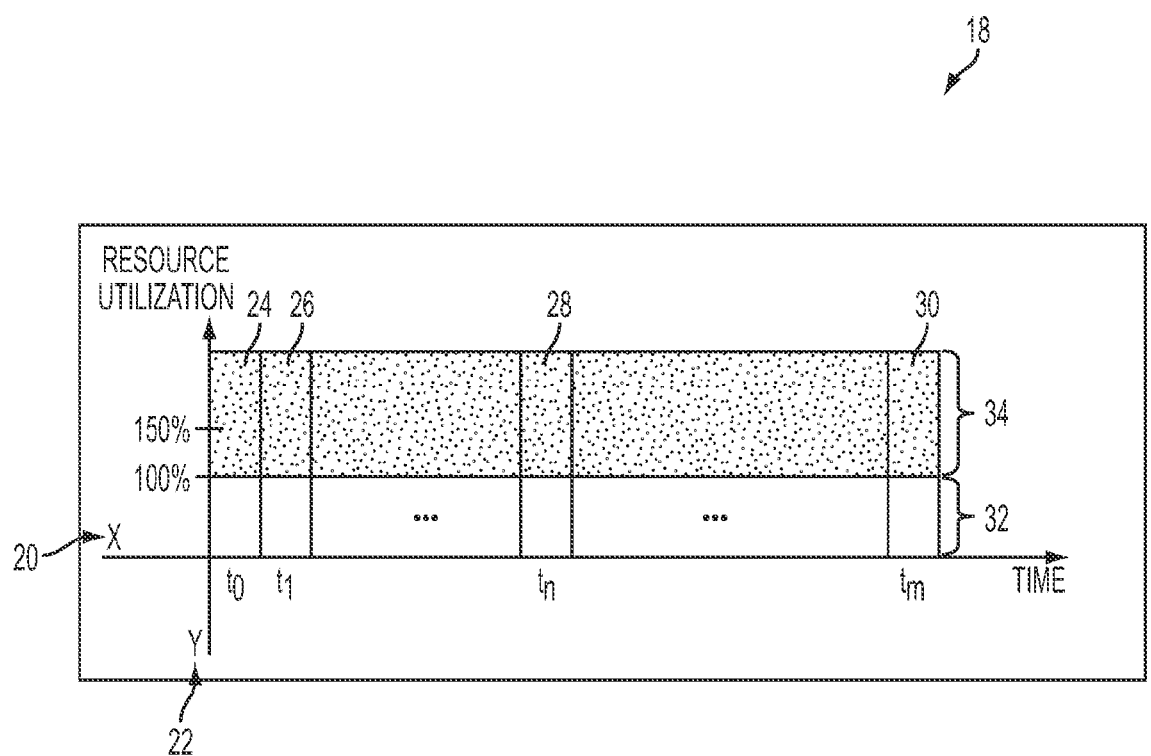
FIG. 2 illustrates a booking window according to exemplary embodiments.

According to an exemplary embodiment, a booking window 18 is shown in FIG. 2. Booking window 18 shows time on the X axis 20 and resource utilization on the Y axis 22. The booking window can be partitioned into transmission slots, for example, $t_0$ 24, $t_1$ 26, $t_n$ 28. Transmission slot $t_0$ 24 denotes the current transmission slot and $t_m$ 30 denotes the size of the booking window in units of transmission slots, e.g., m units of transition slots. The booking window 18 can also show a normal booking section 32 for 0-100% booking of resources and an overbooking section 34 where the booking window 18 can be overbooked. The overbooking can occur per transmission slot. Additionally, the overbooking can be a configurable amount by, for example, the network operator in charge of the node, e.g., eNB 6 and/or GW 12, which performs one or more admission control functions. However, other systems, methods and information can also be used for configuring the overbooking amount, e.g., historical data, criticality of the service, local experimentation and the like.

Figure 3:
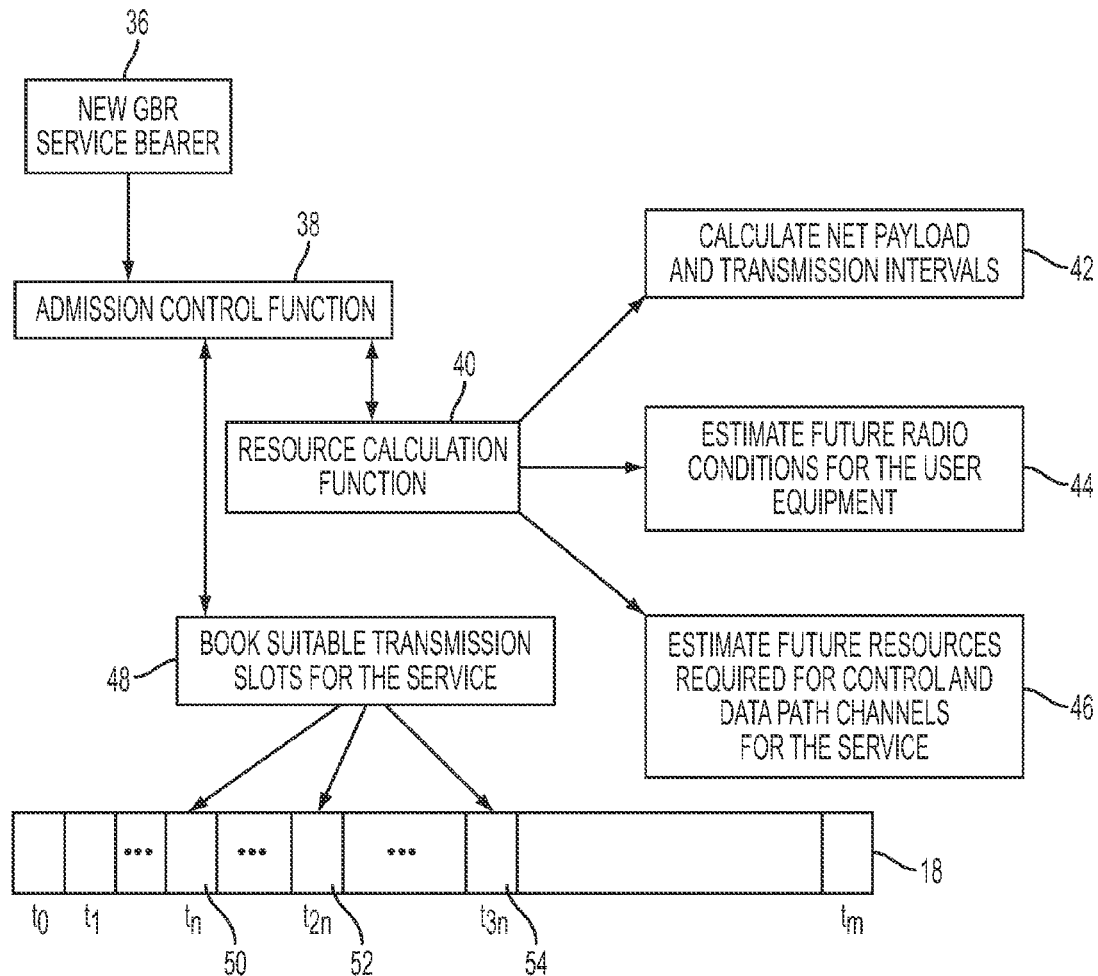
FIG. 3 shows an admission control method for a guaranteed bit rate (GBR) service according to exemplary embodiments.

According to exemplary embodiments, steps associated with admission control for a guaranteed bit rate (GBR) service are shown in FIG. 3. Initially, a new GBR service bearer 36 is sent by, for example, a remotely or locally serviced UE 4 or a remote application server towards a node which includes an admission control function 38. The admission control function 38 includes a resource calculation function 40 which can perform the steps of: (1) calculate net payload and transmission intervals in step 42, (2) estimate future radio conditions for the UE 4 in step 44 and (3) estimate future resources required for control and data path channels for the service (or entity) in step 46. Upon completing the resource calculation, the admission control function 38 can then use the booking window 18 for booking suitable transmission slots for the service in step 48 as described in more detail below. This can be performed for various use cases, such as, local to local UEs, local to remote UEs and local to remote service requests.

As described above, according to exemplary embodiments, FIG. 3 shows a procedure for admitting a GBR bearer. In this example, the admission control function 38 calculates the resources required in the future for the service bearer (or entity). Since GBR bearers have a minimum (or guaranteed minimum) rate, the booking slots can be fixed into a repetitive pattern with transmission intervals that meet the constraints of delay and inter-packet jitter requirements, as well as bandwidth requirements and any other characteristics of the traffic of the bearer as desired. Other criteria such as priority of service, Quality of Service (QoS) classes, present and future levels of resource utilization and channel conditions can also be considered by the admission control function 38. For example, if the system is temporarily overloaded, e.g., during a peak time of the day, the service such as email or file transfer protocol (FTP) may be admitted with an initial delay, assuming that the service quality is not significantly impacted by such delay. This repetitive pattern can be seen in FIG. 3 as shown by the transmission slots $t_{1n}$ 50, $t_{2n}$ 52, and $t_{3n}$ 54 which illustrate the repetitive nature of the service being booked.

Additionally according to exemplary embodiments, hard and soft QoS constraints can be used for consideration when deciding if a UE or a service should be admitted by the admission control function 38. Hard QoS constraints must be met to avoid negative impact to the service for some services, and can include for example, delay, inter-packet jitter and error tolerance. Soft QoS constraints are constraints that do not need to be met all of the time for the service to have acceptable levels of quality. For example, the admission control function 38 may choose to add a minimum bit rate or a maximum delay soft parameter to a non-GBR service to avoid the service from starving during network congestion periods. GBR services may have a soft constraint which is a maximum bit rate (MBR).

According to an exemplary embodiment, the following criteria can be used to book transmission slots for the GBR bearer. Initially, the booking window can search for the slots which have sufficient resources available to meet the GBR bearer requirements. Transmission slots can be selected at fixed intervals that meet the delay and jitter constraints, e.g., the transmission time interval is less than or equal to the delay and/or jitter. The booking into the transmission slots can be done so as to have a desired probability that the QoS constraints can be met for the bearer.

Figure 4:
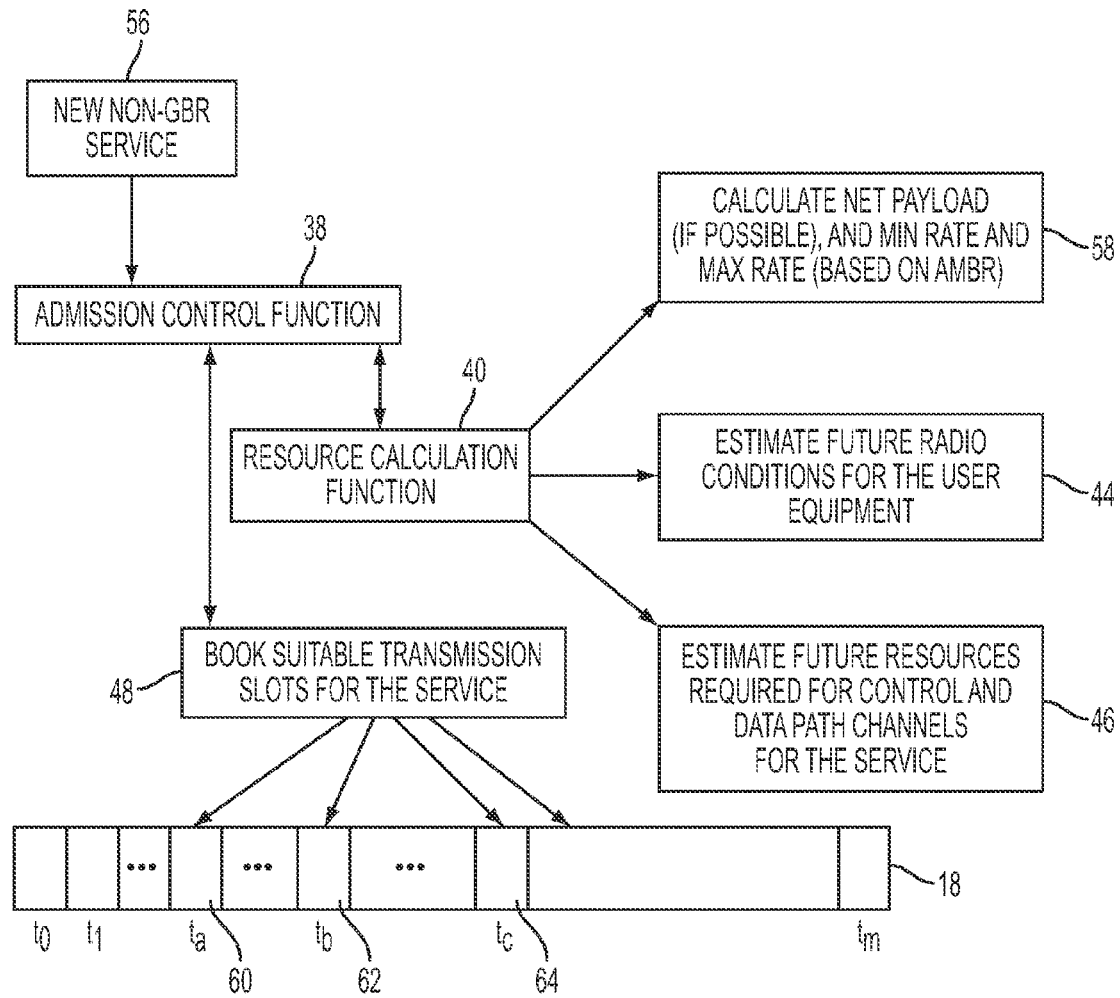
FIG. 4 shows an admission control method for a non-GBR service according to exemplary embodiments.

According to exemplary embodiments, steps associated with admission control for a non-GBR service is shown in FIG. 4. Initially, a new non-GBR service bearer 56 is sent by, for example, a remotely or locally serviced UE 4 or a remote application server towards a communications node which includes an admission control function 38. The admission control function 38 includes a resource calculation function 40 which can perform the steps of: (1) calculate net payload (if possible) and a minimum and a maximum traffic rate based on an aggregated maximum bit rate (AMBR) in step 58, (2) estimate future radio conditions for the UE 4 in step 44 and (3) estimate future resources required for control and data path channels for the service (or entity) in step 46. The AMBR is the maximum allowed sum of the average bit rate of all non-GBR services currently active for the UE 4, and the AMBR is a hard constraint for the UE 4 which can be used for traffic policing and shaping for non-GBR services. Upon completing the resource calculation, the admission control function 38 can then use the booking window 18 for booking suitable transmission slots for the service in step 48 as described in more detail below. This can be performed for various use cases, such as, local to local UEs, local to remote UEs and local to remote service requests.

As described above, according to exemplary embodiments, FIG. 4 shows a procedure for admitting a non-GBR bearer. In this example, the admission control function 38 calculates the resources required in the future for the service bearer (or entity). Since non-GBR bearers do not have a minimum (or guaranteed minimum) rate, the booking slots do not need to be fixed into repetitive patterns of similar transmission intervals. However, if the non-GBR service happens to have identifiable QoS constraints, the booking process can try to take the constraints into consideration as well as any other characteristics of the traffic of the bearer as desired. Additionally, it may not be possible to calculate net payload for all service requests, for example, if the service request is for web browsing it can be difficult to impossible to predetermine what web browsing a user may do and hence to calculate the associated net payload. In this example, the transmission slots booked for the non-GBR service are found to have sufficient resources and are identified by the transmission slots $t_a$ 60, $t_b$ 62, and $t_c$ 64.

According to an exemplary embodiment, the following criteria can be used to book transmission slots for the non-GBR bearer. Initially, the booking window 18 can search for the slots which have sufficient resources available. When a transmission slot is booked, the AMBR of the subscriber is checked so that it is not exceeded within the booking window. When booking transmission slots for non-GBR bearers, a minimum bit rate could be used to ensure that non-GBR bearers do not starve. The minimum rate can be a percentage of the subscriber's AMBR, a value deduced from other QoS parameters, or a configured constant. The overall window load can be checked to decide what traffic rate to book for the non-GBR bearer. The booked traffic rate falls between the minimum and the maximum rates as calculated in step 58 of FIG. 4. If the non-GBR bearer has constraints such as tolerated jitter, delay, etc., the booking window can be setup such that the probability of the constraints being met is improved, optimized or maximized as desired. Additionally, for non-GBR bearers there may not always be enough information or QoS constraints to decide on the payload sizes and transmission intervals. Therefore, in this context, non-GBR bearers may be more flexible than GBR bearers and may be used to fill out transmission slots (or portions of transmission slots) which are not used by more demanding GBR services.

According to exemplary embodiments, a scheduler, which can be a part of the communications node which includes the admission control function 38, can use the information in the booking window to schedule transmissions in the current transmission time interval (TTI), i.e., the current transmission slot. The scheduler can schedule the GBR services, followed by the non-GBR services. The prioritization of non-GBR bearers may take into account if a bearer is at risk of not meeting one or more constraints, such as, a minimum rate. The scheduler can make use of, if available, at least the following information from the booking window in support of scheduling the current TTI: (1) the subscriber(s) to schedule for transmission, (2) the bearer(s) for the subscriber(s) to schedule for transmission and (3) the net payload, i.e., the bits to transmit, for each bearer.

Figure 5:
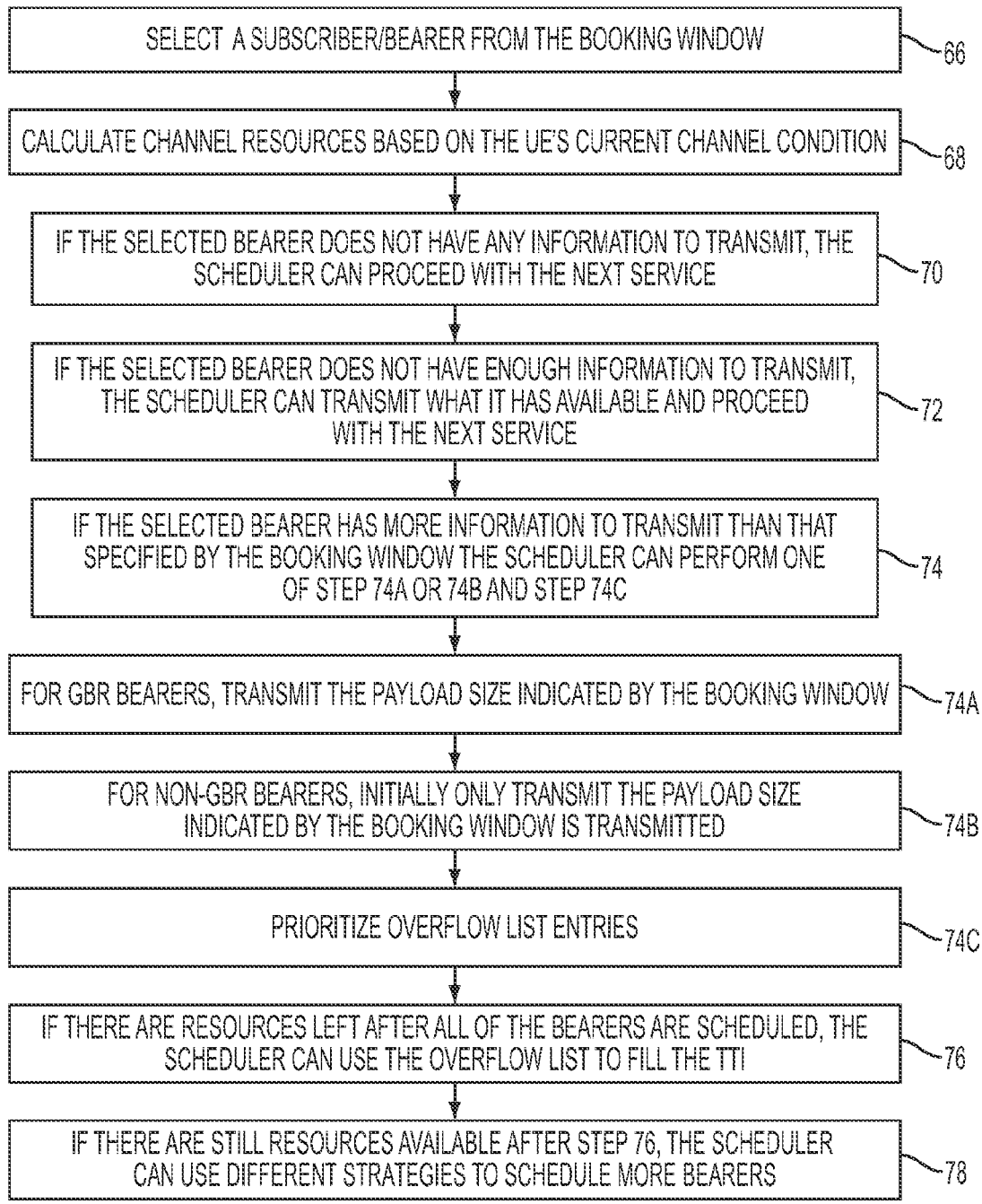
FIG. 5 shows a flowchart for scheduling according to exemplary embodiments.

According to an exemplary embodiment, a method for scheduling a bearer is shown in the flowchart of FIG. 5. Initially, the scheduler can select a subscriber/bearer from the booking window 18 in step 66. The scheduler can then calculate channel resources, e.g., prioritized bit rates, modulation and coding scheme and the like, based on the UE 4's current channel condition in step 68. If the selected bearer does not have any information to transmit, the scheduler can proceed with the next service in step 70. If the selected bearer does not have enough information to transmit, the scheduler can transmit what it has available and proceed with the next service in step 72. If the selected bearer has more information to transmit than that specified by the booking window 18, the scheduler can perform one of step 74A or 74B and step 74C if appropriate as shown in box 74.

For GBR bearers, when the selected bearer has more information to transmit than that specified by the booking window 18, the scheduler may transmit the payload size indicated by the booking window 18 in step 74A. However, the bearer may be added to an overflow list which contains the bearers that are potential candidates to schedule if there is space left at the end of the scheduling procedure for a specific TTI. For non-GBR bearers, initially only the transmit payload size indicated by the booking window is transmitted in step 74B. However, the bearer may be added to a list of candidates of bearers to schedule if there is space left at the end of the scheduling procedure for the specific TTI. The overflow list, which can be maintained by the scheduler, includes entries which are prioritized, in step 74C, based on various criteria such as which bearers are at higher risks of not meeting their QoS constraints and the like. Additionally, other parameters may be used for prioritizing the overflow list, e.g., channel conditions, priority associated with the service or bearer, the type of service, the services are below or above the bit rates estimated in the booking window 18 and/or the wait time of the service for transmitting a packet.

After performing the initial transmission as described above, if there are still resources left after all of the bearers are scheduled, the scheduler can use the overflow list to fill the TTI in step 76. If there are still resources available after step 76, the scheduler can use different strategies to schedule more bearers in step 78, such as using bearers from the next transmission slot and/or using a retransmission list followed by higher priority services which can be followed by lower priority services. According to exemplary embodiments, if the scheduler determines that the booking window 18 is too inaccurate, adjustment can be performed to future booking slots based on, for example, average radio conditions per the UE 4 and average past payload/queue sizes per the UE 4 or the bearer. The above described example associated with FIGS. 5(a) and 5(b) is one method for making use of the resource booking window 18 for scheduling purposes, however other methods may alternatively be used.

Using the above described exemplary embodiments, a purely illustrative example is now described for a net payload estimate for GBR bearers for a VoIP service. Initial parameters associated with the VoIP service are shown below in Table 1.

TABLE 1

| Parameter | Value |
| --- | --- |
| Service | Codec G.711, 64 kbps |
| Tolerated Delay | d = 20 ms |
| Traffic Rate | r = 64 kbps |
| Silence Suppression | No |

Information can be obtained from various places within the communication network for determining the parameters and their values. For example, in some cases the information can be obtained for a service from the HSS 10, or looked up elsewhere when a specific Codec is associated with a service. Additionally, other information could be obtained from the network operator.

Continuing on with this net payload estimate for a GBR bearer, the estimated average payload can be calculated from the provided service information (64 kbps) and adding an estimation for the additional payload from other data which may be added on, e.g., various headers, as shown below in equation (1).

$$P1 = 69 \text{ kbps} \quad (1)$$

The estimated payload per transmission is shown in equation (2).

$$P2 = (r/1000) \times d \quad (2)$$
$$= (64 \text{ kbps}/1000 \text{ ms}) \times 20 \text{ ms}$$
$$= 1280 \text{ bits per transmission}$$

Estimates used here also include the following: (1) that packets are to be transmitted every 20 ms and 92) that the payload to be transmitted is 1280 bits.

According to exemplary embodiments, resources can, in some cases, be estimated for non-GBR services. For example, various past and current behavior of a subscriber can be used to estimate parameters such as payload sizes, transmission intervals, traffic rates (which can be implied by the previously two listed parameters), call duration and the like. These parameters can allow for a more accurate booking of resources during admission of new bearers. Other parameters that may be deduced from subscriber statistics and used as well, include but are not limited to: device capabilities, average channel conditions, mobility patterns, behavior at different times of the day and/or behavior on different days of the month and the like.

According to exemplary embodiments, UEs 4 can transmit to their respective eNBs 6 periodic reports describing the channel conditions. These channel condition reports can be used over a period of time to calculate the average channel conditions for the UE 4. These values may then be used to update the load of the booking window 18 for any or all booked transmissions for the UE 4. The UE 4 can also send buffer status information to the eNB 6 to indicate that there is data to transmit by the UE 4. This information can then be combined with the information in the booking window 18 to decide if a transmission is desired and/or required. The scheduler in the eNB 6 may find that there is a disparity between what is booked and the resources required by an event or a subscriber service. If the disparity is too large over a period of time, adjustment to future booking slots can be performed.

Exemplary embodiments have described admission control between communication nodes. These exemplary embodiments can occur, as desired, in both the uplink and the downlink. Exemplary embodiments can provide a simplification of scheduling procedures since the scheduler can rely on the booking window 18 to choose the next subscriber service without using complex scheduling algorithms that may ignore some traffic characteristics or overall system load. Automatic traffic shaping and traffic policing per bearer and per subscriber can be performed. The booking window 18 can restrict the bearers to transmit only certain rates at certain time slots, therefore shaping and policing the bearer and user rates comes "free", e.g., packet discards can be implemented when booked resources are fully utilized when excess traffic arrives. This can bring a more balanced use of resources among users, while also bringing the potential for more satisfied end users.

Figure 6:
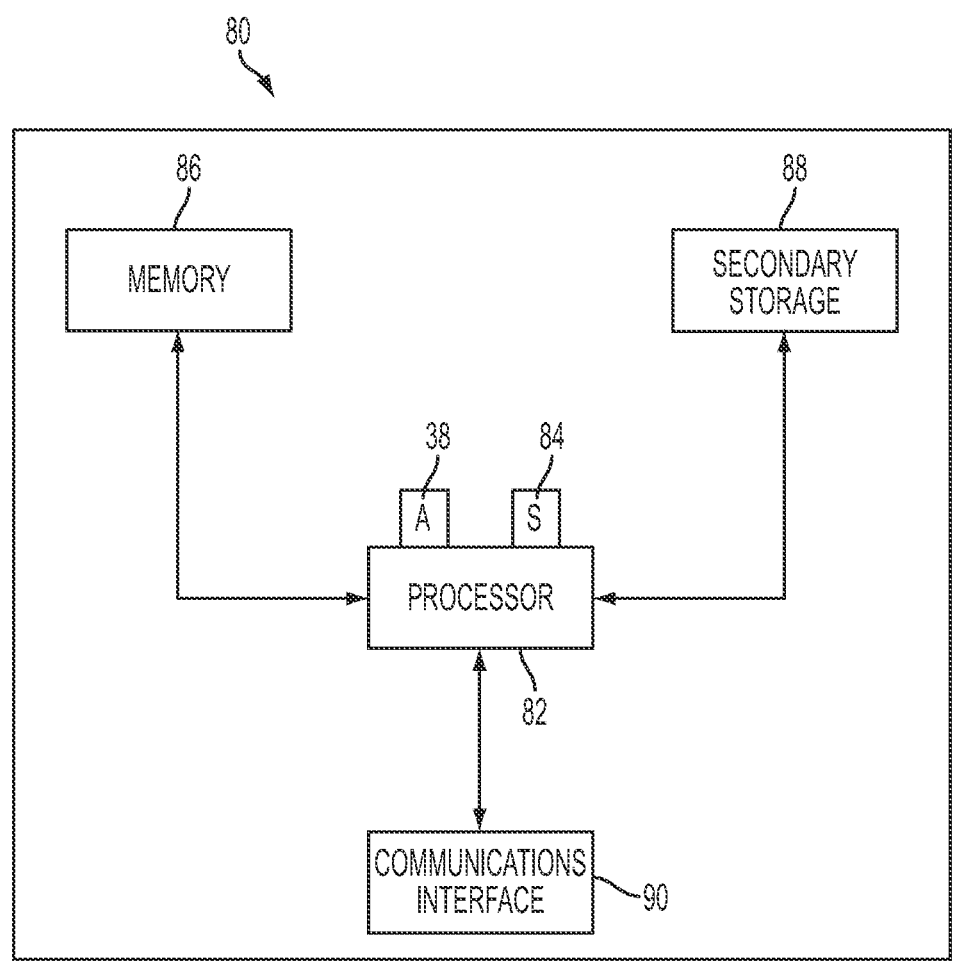
FIG. 6 illustrates a communications node according to exemplary embodiments.

The exemplary embodiments described above provide for admission control and scheduling for a node in a communication system. An exemplary communications node 80 which can perform admission control and/or scheduling, e.g., the eNB 6, the GW 12, MME 8 (for control plane scheduling) and other IP routers (or nodes), will now be described with respect to FIG. 6. The communications node 80 can contain a processor 82 (or multiple processor cores) which can include an admission control function 38 and a scheduler 84, memory 86, one or more secondary storage devices 88 and an interface unit 90 to facilitate communications between the communications node 80 and other nodes/devices that communicate with the communications system. The processor 82 with its associated admission control function 38 and scheduler 84 can execute instructions to facilitate the exemplary embodiments described above with respect to the admission control and scheduling functions described herein. Memory 86 can be used to store information associated with admission control and scheduling, including codec information, channel condition information, prioritization criteria and the results of resource calculation as desired. Thus, communications node 80 can perform the exemplary embodiments described herein for any node, e.g., the eNB 6, MME 8, GW 12 and various routers, which performs admission control and/or scheduling.

Figure 7:
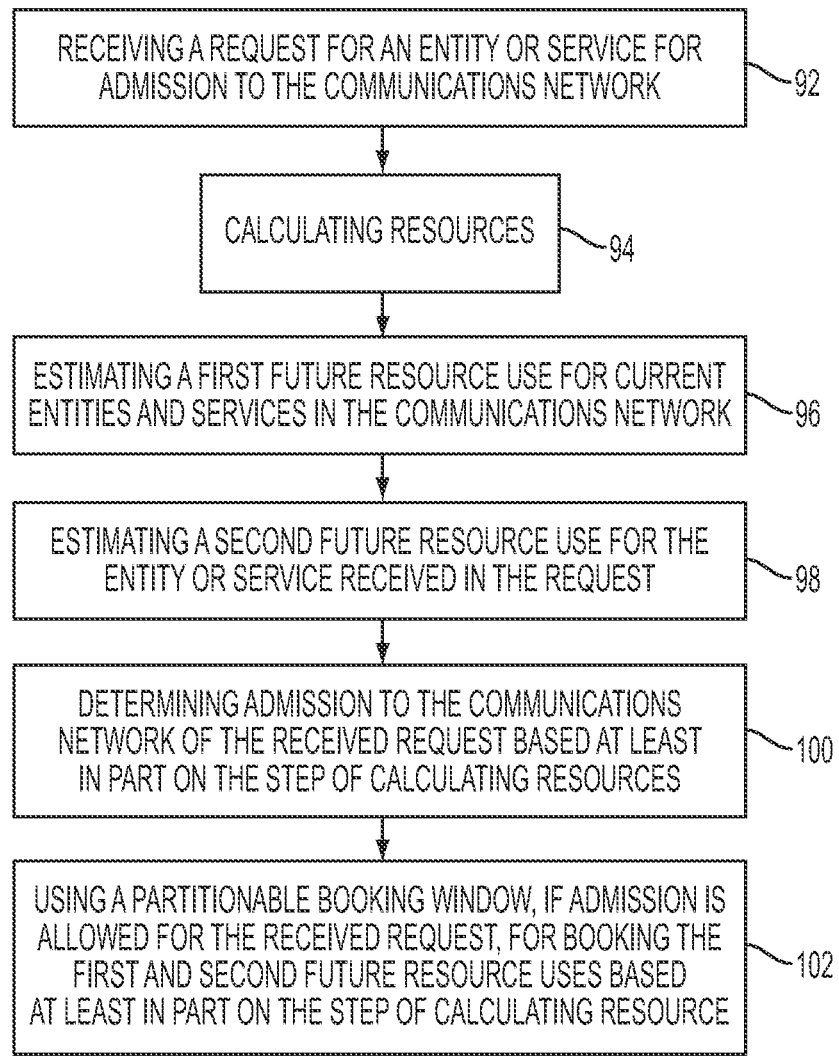
FIG. 7 shows a method flowchart according to exemplary embodiments.

An exemplary method for performing admission control in a communications network is illustrated in FIG. 7. Therein, at step 92, receiving a request for an entity or service for admission to the communications network; at step 94, calculating resources, wherein the step of calculating resources includes: at step 96, estimating a first future resource use for current entities and services in the communications network; and at step 98, estimating a second future resource use for the entity or service received in the request; at step 100, determining admission to the communications network of the received request based at least in part on the step of calculating resources; and at step 102, using a partitionable booking window, if admission is allowed for the received request, for booking the first and second future resource uses based at least in part on the step of calculating resources.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for performing admission control in a communications network, the method comprising:
    receiving a request for an entity or service for admission to the communications network;
    calculating resources, wherein the step of calculating resources include:
        estimating a first future resource use for current entities and services in the communications network; and
        estimating a second future resource use for the entity or service received in the request;
    determining admission to the communications network of the received request based at least in part on the step of calculating resources; and
    using a partitionable booking window, if admission is allowed for the received request, for booking the first and second future resource uses based at least in part on the step of calculating resources.

2. The method of claim 1, further comprising:
    scheduling the first and second future resources into a plurality of transition time interval slots in the partitionable booking window.

3. The method of claim 2, further comprising:
    prioritizing overflow list entries; and
    using the overflow list entries to fill an unfilled transition time interval.

4. The method of claim 1, further comprising:
    booking the first future resource which is associated with a guaranteed bit rate bearer into a repetitive pattern at fixed intervals in the booking window.

5. The method of claim 4, wherein the guaranteed bit rate bearer is associated with a Voice over Internet Protocol (VoIP) service.

6. The method of claim 1, further comprising:
booking the first future resource which is associated with a non-guaranteed bit rate bearer such that the booking fills out transmission time slots.

7. The method of claim 6, wherein the non-guaranteed bit rate bearer is associated with a web browsing service.

8. The method of claim 1, wherein the communication node is an eNodeB.

9. The method of claim 8, further comprising:
performing admission control by the eNodeB for requests from at least one user equipment.

10. The method of claim 1, wherein the communication node is a gateway.

11. The method of claim 10, further comprising:
performing admission control by the gateway for requests from at least one eNodeB.

12. The method of claim 1, further comprising:
limiting bit rates for a service by distributing a desired resource use amount over time.

13. The method of claim 1, further comprising:
implementing packet discards when booked resources are fully utilized when excess traffic arrives.

14. The method of claim 6, further comprising:
allocating a minimum bit rate to the non-guaranteed bit rate bearer.

15. A communications node for performing admission control in a communications network, the communications node comprising:
a communications interface configured to receive a request for an entity or service for admission to the communications network;
a processor configured to operate an admission control function and a scheduler; and
wherein the admission control function is configured to calculate resources, estimate a first future resource use for current entities and services in the communications network, estimate a second future resource use for the entity or service received in the request, determine admission to the communications network of the received request based at least in part on the results of calculating resources, and configured to use a partitionable booking window, if admission is allowed for the received request, for booking the first and second future resource uses based at least in part on the results of calculating resources.

16. The communications node of claim 15, further comprising:
the scheduler configured to schedule the first and second future resources into a plurality of transition time interval slots in the partitionable booking window.

17. The communications node of claim 16, further comprising:
the admission control function configured to prioritize overflow list entries and use the overflow list entries to fill an unfilled transition time interval.

18. The communications node of claim 15, further comprising:
the admission control function configured to book the first future resource which is associated with a guaranteed bit rate bearer into a repetitive pattern at fixed intervals in the booking window.

19. The communications node of claim 18, wherein the guaranteed bit rate bearer is associated with a Voice over Internet Protocol (VoIP) service.

20. The communications node of claim 15, further comprising:
the admission control function being configured to book the first future resource which is associated with a non-guaranteed bit rate bearer such that the booking fills out transmission time slots.

21. The communications node of claim 20, wherein the non-guaranteed bit rate bearer is associated with a web browsing service.

22. The communications node of claim 15, wherein the communication node is an eNodeB.

23. The communications node of claim 22, further comprising:
the eNodeB configured to perform admission control for requests from at least one user equipment.

24. The communications node of claim 15, wherein the communication node is a gateway.

25. The communications node of claim 24, wherein admission control is performed by the gateway for requests from at least one eNodeB.

26. The communications node of claim 15, wherein bit rates for a service are limited by distributing a desired resource use amount over time.

27. The communications node of claim 15, wherein packet discards are implemented when booked resources are fully utilized when excess traffic arrives.

28. The communications node of claim 20, wherein a minimum bit rate is allocated to the non-guaranteed bit rate bearer.

* * * * *

UNITED STATES PATENT AND TRADEMARK OFFICE
CERTIFICATE OF CORRECTION

PATENT NO. : 8,767,539 B2  Page 1 of 1
APPLICATION NO. : 13/190703
DATED : July 1, 2014
INVENTOR(S) : Paredes It is certified that error appears in the above-identified patent and that said Letters Patent is hereby corrected as shown below:

On Title Page 2, in item (56), under "OTHER PUBLICATIONS", in Column 1, Line 5, delete "ETRIi;" and insert -- ETRI; --, therefor.

In the Specification

In Column 8, Line 60, delete "92)" and insert -- (2) --, therefor.

Signed and Sealed this
Fourteenth Day of October, 2014

Michelle K. Lee
*Deputy Director of the United States Patent and Trademark Office*